(12) United States Patent
Hamar

(10) Patent No.: US 6,704,115 B1
(45) Date of Patent: Mar. 9, 2004

(54) LASER TARGET ASSEMBLY FOR SHEAVES AND HEIGHT GAGES

(75) Inventor: Martin R. Hamar, Wilton, CT (US)

(73) Assignee: Hamar Laser Instruments, Inc., Danbury, CT (US)

( * ) Notice: Subject to any disclaimer, the term of this patent is extended or adjusted under 35 U.S.C. 154(b) by 527 days.

(21) Appl. No.: 09/684,029

(22) Filed: Oct. 6, 2000

Related U.S. Application Data

(60) Provisional application No. 60/188,413, filed on Mar. 10, 2000.

(51) Int. Cl.$^7$ .............................................. G01B 11/14
(52) U.S. Cl. ....................................... 356/622; 356/623
(58) Field of Search ................................ 356/614, 622, 356/623, 399–461, 394, 139.09, 139.1, 153; 674/102–105

(56) References Cited

U.S. PATENT DOCUMENTS

| | | |
|---|---|---|
| 4,468,119 A | 8/1984 | Hamar |
| 4,566,202 A | 1/1986 | Hamar |
| 4,679,940 A | 7/1987 | Hamar |
| 4,818,107 A * | 4/1989 | Ono et al. .................. 356/622 |
| 5,307,368 A | 4/1994 | Hamar |
| 5,742,394 A * | 4/1998 | Hansen ........................ 356/620 |
| 5,884,239 A * | 3/1999 | Romanik, Jr. ................ 702/150 |
| 5,929,984 A | 7/1999 | Hamar |
| 6,098,297 A * | 8/2000 | Belfiore ....................... 33/286 |
| 6,434,841 B1 * | 8/2002 | Stahl et al. ................... 33/286 |

* cited by examiner

Primary Examiner—Russell Adams
Assistant Examiner—D. Ben Esplin
(74) Attorney, Agent, or Firm—Anthony J. Casella; Gerald E. Hespos

(57) ABSTRACT

A target assembly is provided for use with a laser alignment system. The target assembly includes three light-sensitive target cells arranged to define corners of a triangle. The light-sensitive target cells are mounted to a support plate such that the three light-sensitive target cells face substantially in the same direction, and such that one axis of each light-sensitive target cell is substantially parallel to the plane of the support plate. The support plate may further include mounting structures for mounting the target assembly to an object that must be checked or aligned. Differences between readings can be used to check misalignment about two perpendicular axes, and averages of the respective readings can be used to check position or displacement. The laser alignment system can be employed to align the parallel rotational axes of a driven and driving sheave of an industrial machine. By mounting the target assembly to the grooves of a sheave, the alignment system can achieve true groove-to-groove alignment.

9 Claims, 4 Drawing Sheets

LASER TARGET ASSEMBLY FOR SHEAVES AND HEIGHT GAGES

This application claims the benefit of the filing date of Provisional Patent Application, U.S. Ser. No. 60/188,413 filed Mar. 10, 2000, the disclosure of which is incorporated herein by reference.

BACKGROUND OF THE INVENTION

1. Field of the Invention

The subject invention relates to a target assembly for use with a laser apparatus and a control or readout apparatus for assessing the alignment of a sheave or for properly aligning a height gage.

2. Description of the Related Art

Many prior art machines include parts that are movable relative to one another. Optimum efficiency of the machines can be achieved when the movable parts are properly aligned relative to one another. However, use of the prior art machines invariably results in the respective movable parts becoming misaligned relative to one another.

The prior art also includes assemblies with parts that must be positioned at a specified location relative to a fixed frame of reference.

The prior art includes many types of apparatus for assessing the alignment of two parts relative to one another. These prior art alignment devices include mechanical devices, such as levels, optical devices, such as sight gages, and electrical devices.

The assignee of the subject invention has developed several alignment systems that employ at least one laser emitter, at least one light-sensitive target cell, a control system and/or readout device. The prior art laser emitter projects a substantially straight laser beam toward the light-sensitive target cell. The prior art target cell identifies the location of the center of energy of the laser beam that impinges on the target cell. The target cell generates signals that can be analyzed by the control system to assess the relative position of the target relative to the laser and to assess the alignment of the laser beam impinging on the target. The data developed in this manner can be used to adjust the position and/or alignment of one or the other of the components being aligned.

The prior art systems of laser emitters and targets have been used very successfully to align parts relative to a specified central axis. For example, a prior art laser alignment system has been used to align rotors and stators along the rotational axis of a turbine. Another prior art laser alignment system has been used to align a rotating tool, such as a drill, to a work piece upon which the tool will act. An example of a prior art laser en alignment system for projecting a rotational axis is shown in the assignee's U.S. Pat. No. 4,566,202.

The assignee of the subject invention also has developed an apparatus for sweeping at least one laser plane. This prior art apparatus works by directing a laser beam into a penta-prism that reflects an input laser beam internally and produces an output beam that is aligned precisely at right angles to the input beam. The penta-prism then is rotated about the axis of the input beam. As a result, the output beam sweeps an laser plane that is perpendicular to the input beam. Targets can be mounted on objects at locations remote from the laser emitter. The positions of these targets and the objects to which the targets are mounted then can be determined precisely by signals generated as the laser beam sweeps across the targets. An apparatus that sweeps such a flat laser plane is disclosed in the assignee's earlier U.S. Pat. No. 4,468,119. An apparatus capable of sweeping a plurality of mutually perpendicular planes is disclosed in the assignee's U.S. Pat. No. 5,307,368. The assignee's U.S. Pat. No. 5,929,984 discloses a system for generating at least one laser scan plane and laser beams that are perpendicular to the plane. The system disclosed in the assignee's U.S. Pat. No. 5,929,984 can be used, for example, to properly position components of an airplane during the manufacture of the airplane.

A sheave is an apparatus that has at least two grooved disks or wheels that rotate about parallel axes. Sheaves also are referred to as pulleys. Sheave systems are incorporated into many industrial machines where the grooved disks or wheels are mounted to parallel shafts and where belts, timing chains or gears are used to rotate parts of the machine about parallel axes. The efficiency of the machine depends partly upon the alignment of the various rotating members. Use of a machine causes bearings to wear and can misalign other supports for the rotating parts. Such misalignment can lead to an accelerated wear and can cause a premature breakage of parts of the machine. Misalignment of rotating components of a sheave system also can degrade the quality of the products being produced by the machine. Additionally, breakage of machine parts leads to downtime of the machine and can impose a very substantial cost penalty on the manufacturing process. Accordingly, there is a demand for an apparatus to accurately assess sheave alignment. The above-described prior art laser apparatus is well suited to checking the alignment of components along a single rotational axis or for checking the position and alignment of parts relative to a reference plane. However, use of the prior art laser apparatus to check parallelism between a plurality of spaced apart rotational axes has been somewhat complicated. Typically, the job of checking machine alignment is assigned to the mechanic or technician who operates the machine. The typical technician may not have the time to perform a complicated sheave alignment check using the prior art laser apparatus. Instead, the technician may employ common "eyeball" methods of sheave alignment using a straight-edge. However, these "eyeball" methods don't provide the necessary accuracy because these methods use the faces of the sheaves, which are rarely parallel to the grooves of the sheaves, as a reference.

Some prior art alignment procedures employ a height gage to check the height of one member relative to another. The prior art apparatus for checking the height of one member relative to another have included line levels and optical sight gages. The prior art laser apparatus also is well suited for this purpose. In particular, the prior art laser apparatus can be used to direct a beam from a first member or reference point to a second member. A target may be positioned on the second member, and the height of one member relative to the other can be determined by readings taken on the target. A target of this type often may be mounted on a target pole that enables the target to be moved vertically along the pole. The position of the target on the pole can be accurately determined mechanically or electro-mechanically. More accurate height information then can be achieved with the photosensitive target. This combination of a laser emitter, a photosensitive target and a target pole will yield very precise readings when the target pole is aligned perfectly vertically. However, the precision enabled by the combination of the laser emitter and photosensitive target can be offset if the target pole is not perfectly vertical. Accordingly, there is a demand for a laser alignment system with a height gage that compensates for misalignment of the target pole from a true vertical alignment

SUMMARY OF THE INVENTION

The subject invention relates to a target assembly for use with a laser, and particularly a laser capable of sweeping a flat optical plane. The target assembly comprises three light-sensitive target cells arranged in a triangle. The target cells may be mounted to a support and face substantially in a common direction relative to the support. The cell planes of two target cells may be coplanar, and the cell planes of all three target planes may be parallel. Preferably, the three targets are arranged to define a substantially equilateral triangle.

The support may include mounting means for mounting the target assembly to a sheave. Alternatively, the support may include mounting means for mounting the target assembly to a height gage. When used for sheave alignment, the support may include mounting structure for mounting the target assembly substantially vertically to a sheave or pulley wheel. When used with a height gage, the support can be mounted substantially horizontally and perpendicular to the target pole. In either embodiment, the mounting means of the support is formed for face-to-face engagement with the grooves of a sheave to allow genuine groove-to-groove alignment. The light-sensitive target cells may be two axis targets capable of generating X and Y coordinates for a laser beam impinging thereon. The target cells may be analog or digital, and in certain embodiments the light-sensitive target cells may be a CCD (charged coupling device).

The target assembly is used by first mounting the laser apparatus on a reference structure to which alignment of an adjustable member will be compared. For example, the reference may be one rotational sheave member in a sheave apparatus. The laser apparatus is leveled and trued by leveling mechanisms incorporated into the apparatus.

The target assembly then is mounted to a portion of the apparatus that is to be aligned. More particularly, the target assembly is mounted such that the support plate of the target assembly is approximately parallel to the optical plane that will be swept by the laser apparatus. Additionally, the target assembly is mounted such that all three light-sensitive target cells substantially face the laser, with one light-sensitive target cell being relatively close to the laser and with the two remaining light-sensitive target cells being spaced further from the laser.

The laser apparatus then is operated to sweep a flat optical plane, such that the laser impinges upon the respective target cells. Readings then are taken by the target cells to identify locations that are impinged upon by the laser. A difference in readings between the two target cells furthest from the laser apparatus will identify a pitch error between the plane of the three target cells and the laser scan plane. Similarly, a difference between the target cell closest to the laser and the average reading on the two more distant target cells (groove) will provide a yaw error reading.

In the typical sheave alignment operation, the support to which the light-sensitive target cells are mounted will be aligned substantially vertical on the sheave. However, the apparatus can be used with a height gage. When the target assembly is used with a height gage, the planar support to which the light-sensitive target cells are mounted will be substantially horizontal and at a selected elevational position on a target pole. Differences in readings of the respective targets can be used to precisely measure roll and pitch, and thereby to enable mathematical compensation for an alignment of the target pole other than perfectly vertical.

DETAILED DESCRIPTION OF THE PREFERRED EMBODIMENTS

Figure 1A:
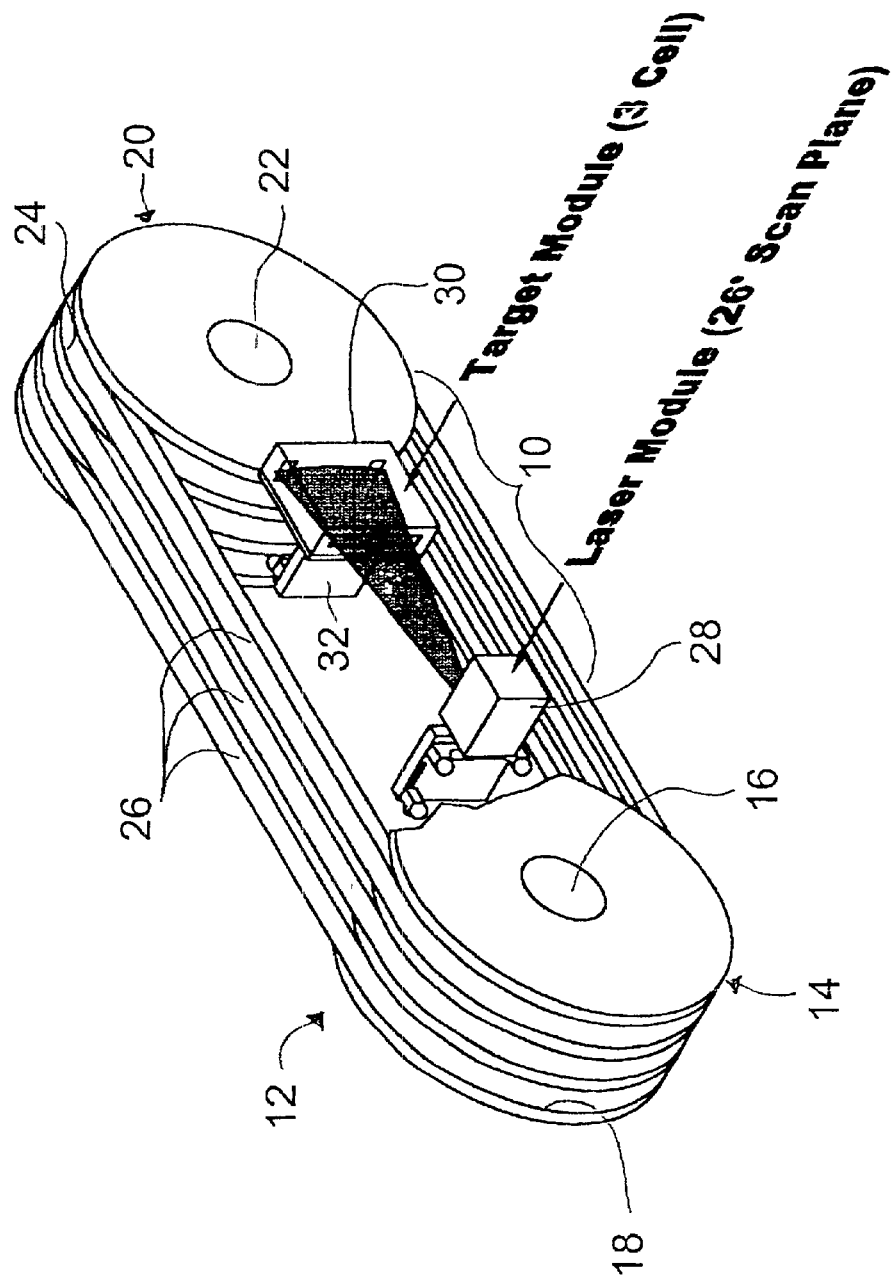
FIG. 1A is a perspective view of a laser and target assembly mounted to a sheave system.

A laser alignment system in accordance with a first embodiment of the invention is identified by the numeral 10 in FIG. 1. The laser alignment system 10 is specifically intended for aligning components of a prior art sheave system 12. The sheave system 12 includes a first sheave 14 mounted to a first rotational axis 16 and having circumferential grooves 18. The sheave system also includes a second sheave 20 mounted to a second rotational axis 22 and having circumferential grooves 24. Belts 26 are mounted in the grooves 18 and 24 and deliver rotation forces from one sheave to another. Ideally the axes 16 and 22 are parallel. However perfect parallelism may not exist. The laser alignment system 10 enables a check of the relative positions and go alignment of the sheaves 14 and 20 so that adjustments can be made.

The laser alignment system 10 includes a laser module 28 and a target module 30. The laser module 28 is operative to sweep a plane, as shown schematically in FIG. 1.

Figure 1C:
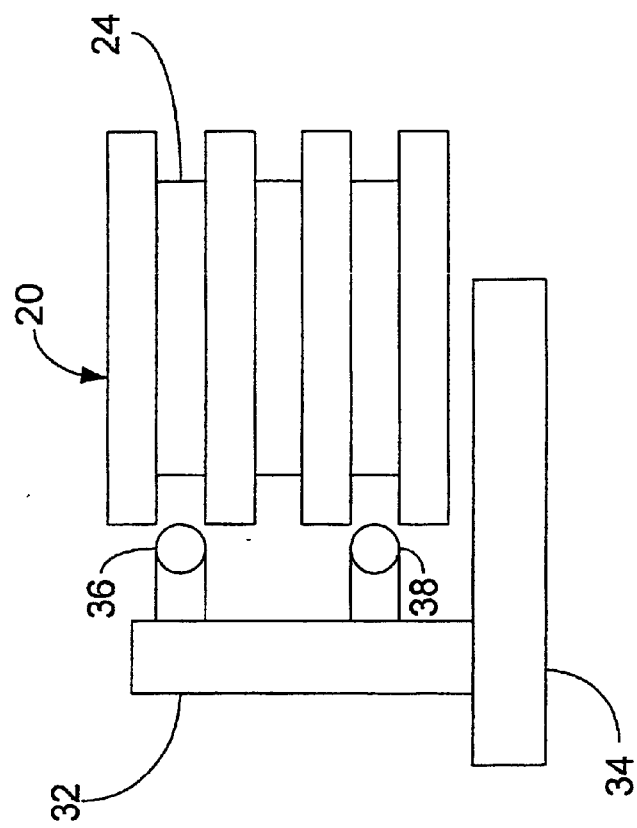
FIG. 1C is a top plan view of a mounting plate of the subject invention engaging the grooves of a sheave.
Figure 1B:
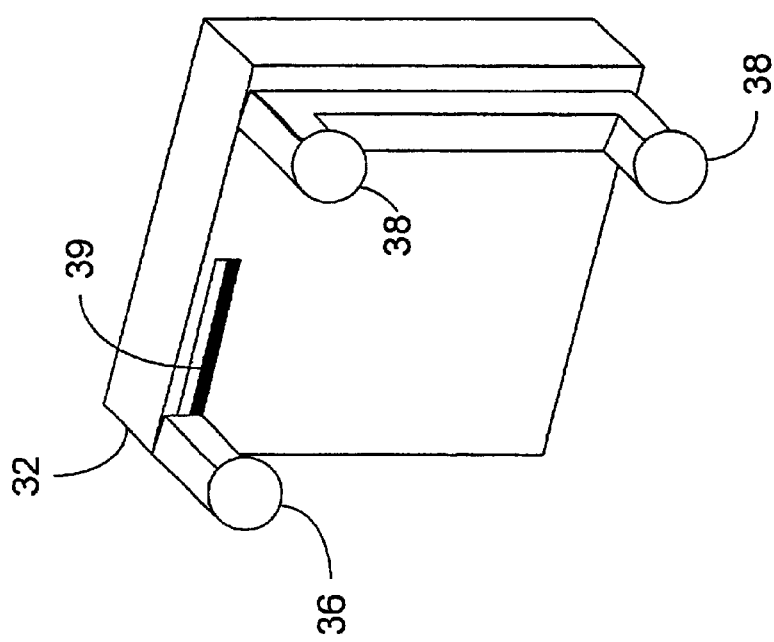
FIG. 1B is a perspective view of a mounting plate in accordance with the subject invention.

Referring to FIGS. 1A–C, the target module 30 comprises a mounting plate 32, a support plate 34 and three light-sensitive target cells A, B and C. The mounting plate 32 includes fixtures for mounting the target module 30 to a groove 24 in the sheave 20. The particular mounting structures on the mounting plate 32 may vary depending upon specifics of a sheave system 12 to be aligned. Typically, the mounting plate 32 is a three-ball mount which qualifies the module 30 in the sheave grooves 24. The balls 36, 38 are arranged in on L-shaped pattern with two balls 38 residing in one groove and one ball 36 residing in a different groove. The single ball 36 is adjustable axially along slot 39 so that it can sit property in its own groove. It can be appreciated that there can be a single ball per groove to increase the stability of the target module 30. An exactly similar arrangement is used to mount the laser module 28 in its sheave.

The support plate 34 is rigidly and permanently mounted to the mounting plate 32. The target cells A, B and C are permanently mounted to the support plate 34 at the target module manufacturing location. The mounting of the photosensitive target cells A, B and C is such that the respective target cells A, B and C all face substantially in the same direction. Additionally, photosensitive target cells B and C are substantially coplanar and target cell A is substantially parallel to the coplanar cell planes of the light-sensitive target cells B and C. Furthermore, all three light-sensitive target cells A, B and C have their vertical axes disposed in a common plane that lies substantially parallel to the plane of the support plate 34.

The target assembly is used with the laser module 28 shown schematically in FIG. 1. The laser module 28 is operative to sweep a laser plane, and specifically the laser module 28 may be any of the known laser devices manufactured by Hamar Laser Instruments, Inc. and capable of sweeping a laser plane. The laser module 28 is mounted to a groove 18 on the first sheave 14, and the optical plane generated by the laser module 28 will define a reference plane to which the adjustable rotational axis 22 and the sheave 20 will be compared. The scan angle of the laser module 28 used to create the reference plane is preferably 26 degrees. The laser module 28 is leveled to ensure that the optical plane is substantially perfectly vertical.

The apparatus 10 may further include a computer connected to the light-sensitive target cells A, B and C for receiving signals produced by the target cells A, B and C and for performing basic mathematical operations that convert the signals received from the target cells A, B and C to alignment data or required correction data. The control system embodied in the computer may be of the type disclosed in U.S. Pat. No. 4,679,940 and/or of the type incorporated into other alignment systems marketed by Hamar Laser Instruments, Inc.

Figure 2:
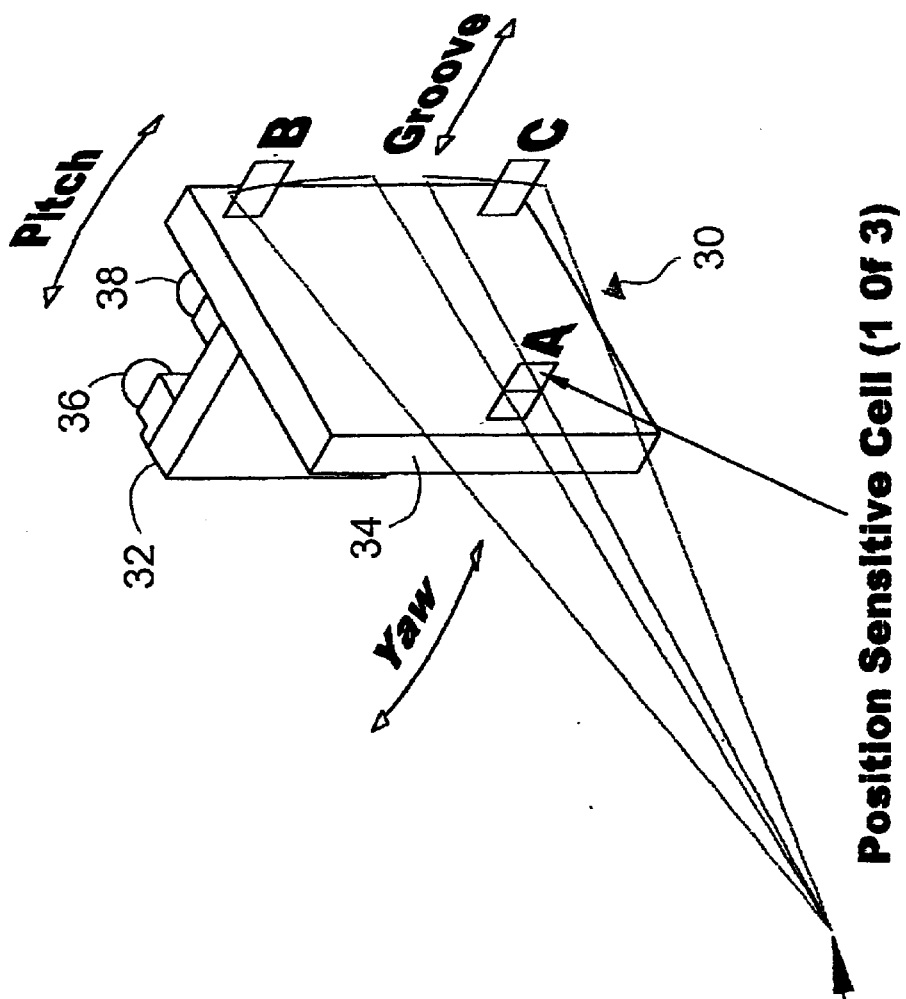
FIG. 2 is a perspective view of a target assembly in accordance with the subject invention and adapted for use with a sheave laser alignment system.

As shown schematically in FIG. 2, the target module 30 can calculate pitch errors by comparing the readings of the light-sensitive target cells B and C. In particular, a pitch misalignment will be proportional to the differences between readings of the light-sensitive target cells B & C, as represented by the formula PITCH=B−C.

A displacement error of the groove 24 relative to the groove 18 can be calculated as one-half the sum or average of the B and C readings, as represented by the formula GROOVE=(B+C)/2. A yaw error can be calculated using the difference between the A target cell reading and the average groove displacement reading, as represented by the formula YAW=A−GROOVE. For clarity, FIG. 2 shows the relative alignment of errors identified as pitch, groove and yaw.

Figure 3:
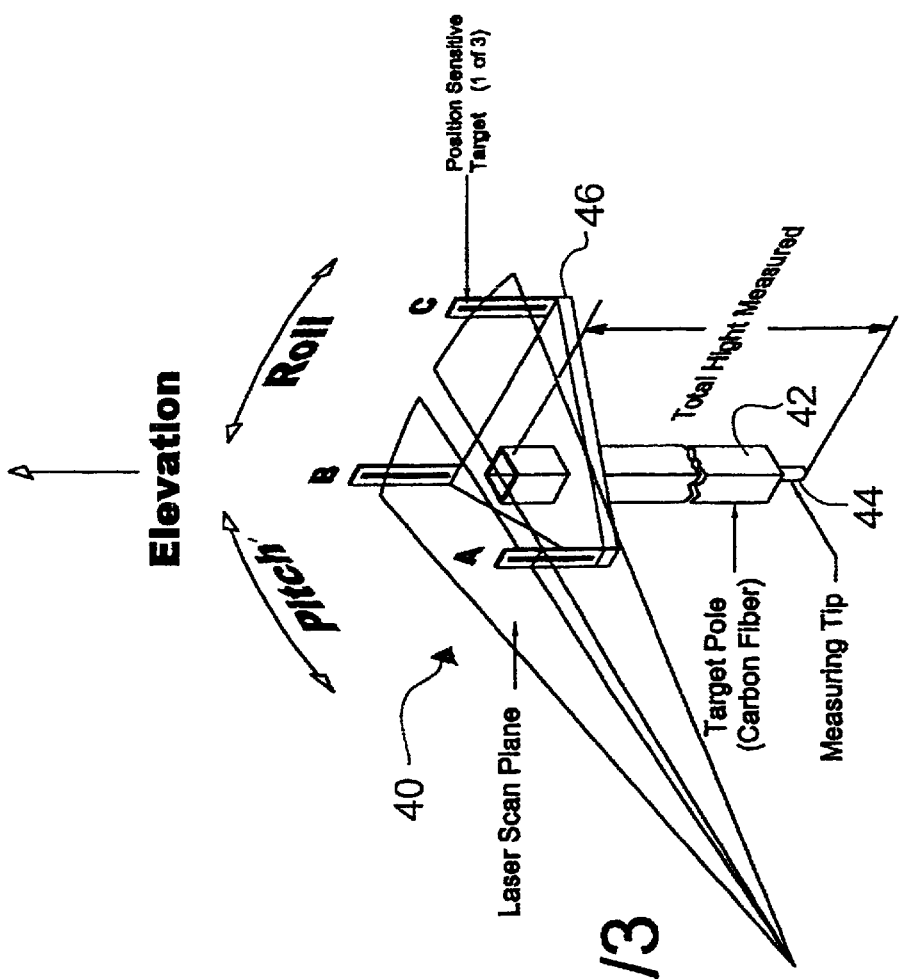
FIG. 3 is a perspective view of a target assembly adapted for use with a height gage.

FIG. 3 shows exactly the same concept as FIGS. 1 and 2, but applied to a height gage system. In particular, the target module of FIG. 3 is identified generally by the numeral 40 and includes a target pole 42 having a measuring tip 44 at one end thereof. A support plate 46 is mounted to the target pole 42 at a location remote from the measuring tip 44. The support plate 46 is substantially perpendicular to the target pole 42.

The target module 40 further includes three light-sensitive target cells A, B and C respectively. The light-sensitive target cells A, B and C are precisely mounted under controlled factory conditions to face substantially from the same direction at known distances and spacings from one another. Additionally, the light-sensitive target cells A, B and C are mounted such that their horizontal reference lines define a common plane that is substantially parallel to the plane defined by the support plate 46.

The target module 40 is used substantially in the same manner as the target module 28 described and illustrated above. In particular, the target module 40 is used with a laser apparatus capable of sweeping a flat optical plane. The laser apparatus is mounted to a fixed reference point and is leveled. The measuring tip 44 of the target pole 42 then is placed on the object that requires a positioning or height check. The laser module then is operated to sweep a horizontal scan plane that impinges upon the respective light-sensitive target cells A, B and C. Differences between readings on the target cells B and C will identify a roll error (ROLL=B−C). A pitch error can be calculated as the difference between a reading on the A target and the average of the readings on the B and C targets (PITCH=A−(B+C)/2. Elevation is the average of all three target readings (A+B+C)/3.

A significant advantage of the three-target module 40 is that the angular position of the target pole 42 of the height gage target module 40 relative to the laser plane fig is readily determined by the differences in the three cells as described above in the description of the sheave target system. Thus, an accurate reading with the height gage module 40 does not require the technician to initially square the target pole 42. Rather, this squaring or truing of the target pole 42 can be carried out mathematically.

While the invention has been described with respect to a preferred embodiment, it is apparent that various changes can be made without departing from the scope of the invention as defined by the appended claims.

What is claimed is:

1. A target assembly for a laser alignment system, the target assembly comprising three light-sensitive target cells fixedly mounted to a support plate in proximity to one another to define corners of a triangle, the light-sensitive target cells all facing in a common direction, each said target cell having first and second perpendicular axes, the first axes of said target cells being mutually parallel to one another, the second axes of the target cells being coplanar and substantially parallel to the support plate, said target assembly having a ball mount for mounting the target assembly to a sheave such that the support plate and the second axes of the respective light-sensitive target cells are aligned substantially perpendicular to a rotational axis of the sheave, and wherein said ball mount includes a plurality of balls arranged in an L-shaped pattern to engage a plurality of grooves of said sheave.

2. The target assembly of claim 1, wherein at least one said ball of the plurality of balls is adjustable to properly engage said grooves of said sheave.

3. A target assembly as in claim 1, further comprising a target pole, said support plate being mounted to an end of the target pole such that the support plate and the second axes of the respective light-sensitive target cells are substantially perpendicular to the target pole.

4. A sheave laser alignment system, said system aligns a rotational axis of a first sheave to a parallel rotational axis of a second sheave, said system comprising:

a laser module operative to sweep a reference plane, said laser module mounted to a groove on said first sheave;

a target assembly mounted to a groove on said second sheave, said target assembly having three light-sensitive target cells fixedly mounted to a support plate in proximity to one another to define corners of a triangle, the light-sensitive target cells all facing in a common direction, each said target cell having first and second perpendicular axes, the first axes of said target cells being mutually parallel to one another, the second axes of the target cells being coplanar and substantially parallel to the support plate; and a ball mount for mounting the target assembly to said sheave such that the support plate and the second axes of the respective light-sensitive target cells are aligned substantially perpendicular to said rotational axis of the sheave, said ball mount including a plurality of balls arranged in an L-shaped pattern to engage a plurality of grooves on said sheave.

5. The system of claim 4, wherein at least one said ball of the plurality of balls is adjustable to properly engage said grooves of said sheave.

6. The system of claim 4, further comprising a target pole, said support plate being mounted to an end of the target pole such that the support plate and the second axes of the respective light-sensitive target cells are substantially perpendicular to the target pole.

7. A method of aligning components of a sheave system, said sheave system includes a first sheave having circumferential grooves, said first sheave mounted to a first rotational axis and a second sheave having circumferential grooves, said second sheave mounted to a second rotational axis, said method comprising:

fixing a laser module to the grooves of said first sheave;

fixing a target assembly to the grooves of said second sheave;

generating a reference plane by said laser module;

measuring alignment data received from said target assembly;

calculating correction data based on the measured alignment data; and adjusting said first and second sheave until said correction data is within an acceptable range, wherein the step of fixing a target assembly to the grooves of said second sheave includes providing three light-sensitive target cells fixedly mounted in said target assembly, said cells mounted in proximity to one another to define corners of a triangle, the cells all facing in a common direction, said target assembly arranged such that two said cells lie in the same perpendicular plane to the generating direction of the reference plane and are positioned further away from said laser module than a first cell, and wherein the step of calculating correction data includes calculating a pitch error by comparing the measuring alignment data of the two furthest said cells of said target assembly.

8. A method as in claim 7, wherein the step of calculating correction data includes calculating a displacement error of the grooves by averaging the measuring alignment data of the two furthest said cells of said target assembly.

9. A method as in claim 8, wherein the step of calculating the correction data includes calculating a yaw error by finding the difference between the measuring alignment data of said first cell closest to said laser module and said displacement error of the grooves.

* * * * *